United States Patent

Vickers, Jr. et al.

[11] Patent Number: 6,136,950
[45] Date of Patent: *Oct. 24, 2000

[54] HIGHLY EFFICIENT CEMENT DISPERSANTS

[75] Inventors: Thomas M. Vickers, Jr., Concord Township; Runhai Lu, Stow; Lynn E. Brower, Solon; Samy M. Shendy, Cuyahoga Falls; Rainer Packe-Wirth, Cleveland Heights; Hong Gao, Twinsburg, all of Ohio

[73] Assignee: MBT Holding AG, Zurich, Switzerland

[*] Notice: This patent issued on a continued prosecution application filed under 37 CFR 1.53(d), and is subject to the twenty year patent term provisions of 35 U.S.C. 154(a)(2).

[21] Appl. No.: 08/935,608

[22] Filed: Sep. 23, 1997

[51] Int. Cl.$^7$ ............ C08G 69/00; C04B 24/12; C04B 24/24
[52] U.S. Cl. ............ 528/363; 528/328; 528/335; 525/66; 525/420; 525/422; 106/608; 106/696; 106/719; 106/724; 106/727; 106/728; 106/819; 106/823
[58] Field of Search ............ 528/66, 420, 422, 528/363, 328, 335; 106/696, 724, 719, 727, 728, 819, 823, 608

[56] References Cited

U.S. PATENT DOCUMENTS

| | | |
|---|---|---|
| 3,052,655 | 9/1962 | Fox et al. . |
| 3,846,380 | 11/1974 | Fujimoto et al. . |
| 4,745,161 | 5/1988 | Saudek et al. ............ 525/420 |
| 4,888,398 | 12/1989 | Bichon et al. . |
| 5,037,900 | 8/1991 | Yoshino et al. ............ 525/433 |
| 5,061,750 | 10/1991 | Feijen et al. . |
| 5,158,996 | 10/1992 | Valenti ............ 524/5 |
| 5,247,068 | 9/1993 | Donachy et al. . |
| 5,260,272 | 11/1993 | Donachy et al. . |
| 5,284,512 | 2/1994 | Koskan et al. . |
| 5,284,936 | 2/1994 | Donachy et al. . |
| 5,342,918 | 8/1994 | Howelton et al. . |
| 5,357,004 | 10/1994 | Calton et al. . |
| 5,371,177 | 12/1994 | Pail et al. . |
| 5,371,179 | 12/1994 | Paik et al. . |
| 5,393,343 | 2/1995 | Darwin et al. . |
| 5,408,028 | 4/1995 | Wood et al. . |
| 5,410,017 | 4/1995 | Bortnick et al. . |

(List continued on next page.)

FOREIGN PATENT DOCUMENTS

| | | |
|---|---|---|
| 294905 | 3/1993 | European Pat. Off. . |
| 0 753 488 | 6/1996 | European Pat. Off. . |
| 4427233 | 6/1994 | Germany . |
| 52-052942 | 4/1977 | Japan . |
| 5-321720 | 12/1993 | Japan . |
| 2307689 | 4/1997 | United Kingdom . |
| WO 91/01343 | 2/1991 | WIPO . |
| WO 95/09821 | 4/1995 | WIPO . |
| WO 95/35337 | 12/1995 | WIPO . |
| WO 97/18249 | 5/1997 | WIPO . |

OTHER PUBLICATIONS

Abstract of JP4153223, WPI, May 1992.
U.S. application No. 09/106,452, Vickers et al., filed Jun. 30, 1998.
Derwent WPI Publication, Acc. No. 92–402265/199249. English language abstract for JP 4298533 A.
Derwent WPI Publication, Acc. No. 83–803604/198344. English language abstract for JP 58105758 A.
JAPIO Publication No. 09–235372. English language abstract for JP 9235372 A.

Primary Examiner—Mark L. Warzel
Attorney, Agent, or Firm—Renner, Kenner, Greive, Bobak, Taylor & Weber

[57] ABSTRACT

The invention is directed to a polymer dispersant comprising a substituted polyimide or polyamide backbone, having at least some proportion of oligomeric or polymeric grafted side chains including one of amides, esters, and thioesters, having the general formula:

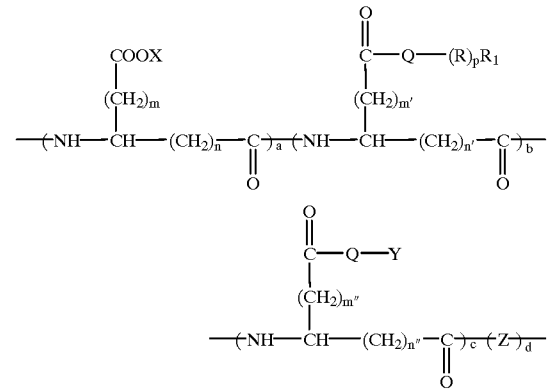

wherein X is at least one of hydrogen, an alkali earth metal ion, an alkaline earth metal ion, ammonium ion, and amine; R is at least one of $C_1$ to $C_6$ alkyl(ene) ether and mixtures thereof and $C_1$ to $C_6$ alkyl(ene) imine and mixtures thereof; Q is at least one of oxygen, nitrogen, and sulfur; p is a number from 1 to about 300 resulting in at least one of a linear and branched side chain; $R_1$ is at least one of hydrogen, $C_1$ to $C_{20}$ hydrocarbon, and functionalized hydrocarbon containing at least one of —OH, —COOH, a derivative of —COOH, sulfonic acid, a derivative of sulfonic acid, amine, and epoxy; Y is a hydrophobic hydrocarbon or polyalkylene oxide moiety that functions as a defoamer; m, m', m", n, n', and n" are each independently 0 or an integer between 1 and about 20; Z is a moiety containing at least one of i) a compound containing at least one amine and one acid group, ii) two functional groups capable of incorporating into the backbone selected from the group consisting of dianhydrides, dialdehydes, and di-acid chlorides, and iii) a succinimide residue; and wherein a, b, c and d reflect the mole fraction of each unit wherein the sum of a, b, c and d equal one, wherein a, b, c and d are each a decimal of value greater than or equal to zero and less than one, and at least two of a, b, c and d are greater than zero.

31 Claims, No Drawings

HIGHLY EFFICIENT CEMENT DISPERSANTS

FIELD OF THE INVENTION

This invention is directed to polymers that function as highly efficient cement dispersants. More particularly, the invention is directed to polycarboxylate polymers comprising a functionalized polyamide main chain polymer onto which are grafted at least some oligomeric or polymeric, hydrophilic side chains, the result being highly efficient cement dispersants.

BACKGROUND

Dispersants are substances that improve the flow characteristics of the cement slurry by breaking up cement agglomerates and freeing the water, thus giving slurries of lower viscosity and allowing desirable flow conditions to be obtained at lower pump pressures. V. S. Ramachandran, *Concrete Admixtures Handbook: Properties, Science, and Technology*, Noyes Publications (Second Edition, 1995). Superplasticizers such as sulfonated melamine formaldehyde condensate (SMF) and sulfonated naphthalene formaldehyde condensate (BNS) are commonly used as dispersants. However, these compounds require more than the desired amount of material to achieve a desired level of concrete workability or water reduction. In addition, these materials do not achieve full range (Type A to Type F) water reducing capability.

It is important that dispersants are used in concrete situations where strength and durability are involved, as dispersants are a necessary component in high strength and high durability concretes. Due to the use of low water amounts in the high performance concretes, sometimes high dispersant amounts are necessary to achieve workable concretes. High BNS levels can lead to undesirable retardation of set and may not provide the required workability retention over time.

It is desirable to provide a material that is several times more efficient as a cement or concrete dispersant than the traditional materials like BNS and SMF. Improving efficiency reduces the amount of material required to achieve a desired level of concrete workability or water reduction. With respect to the presently used dispersants, BNS and SMF, it is also desirable to improve slump retention while maintaining normal setting characteristics. Providing a dispersant with full range (Type A to F) water reducing capability is also a desirable characteristic.

According to German Patent Application No. 4,427,233, aspartic acid is produced by bringing (a) maleic anhydride, maleic acid, fumaric acid, and/or malic acid into contact with (b) ammonia and/or primary or secondary amines in a molar ratio of (a) to (b) of 1:0.1–1:3, possibly in the presence of co-condensable compounds. Components (a) and (b) are brought into contact with each other at temperatures of above 100° C. and thermally condensed, and the polycondensates are then hydrolized, if desired. Components (a) and (b) are brought into contact with each other in the presence of condensation products of the reaction products of (a) and (b) and of powders which are inert under the polymerization conditions. Polymers which contain aspartic acid imide units in the backbone are thus formed.

Other methods of producing polyaspartic acid are disclosed in WO Publication No. 97/18249, Great Britain Patent No. 2307689, and Japanese Patent Application No. 5-321720. Japanese Patent Application No. 5-321720 discloses a hydraulic cement admixture for use as a dispersant, a water reduction agent, and a flowing agent. The effective components of this hydraulic cement admixture are polyaspartic acid and monomeric derivatives. A relatively high percentage of these additives is required for performance as dispersants.

SUMMARY OF THE INVENTION

It is therefore an object of the present invention to provide a hydraulic cement or concrete dispersant material that is several times more efficient than the traditional dispersants such as BNS and SMF.

It is a further object of the present invention to provide a cement or concrete dispersant material with improved efficiency which reduces the amount of material required to achieve a desired level of concrete workability or water reduction.

It is also an object of the present invention to provide a cement or concrete dispersant material to improve concrete slump retention while maintaining normal setting characteristics.

It is another object of the present invention to provide a cement or concrete dispersant material capable of providing a Type A to Type F water-reducing effect.

The present invention is directed to the use of polycarboxylate polymers, comprising a functionalized polyamide main chain polymer onto which are grafted at least some proportion of oligomeric or polymeric hydrophilic side chains, as highly efficient cement dispersants compared to traditional dispersants such as BNS and SMF. It is previously unknown to attach oligomeric or polymeric hydrophilic side chains to this polymer backbone.

The invention is directed to a polymer dispersant comprising a hydrophilic side chain substituted polyimide or polyamide composition, having at least some proportion of grafted oligomeric or polymeric side chains. The grafted side chains may include linking amides, esters, and thioesters. The polymer dispersant having a hydrophilic side chain substituted backbone has the general formula:

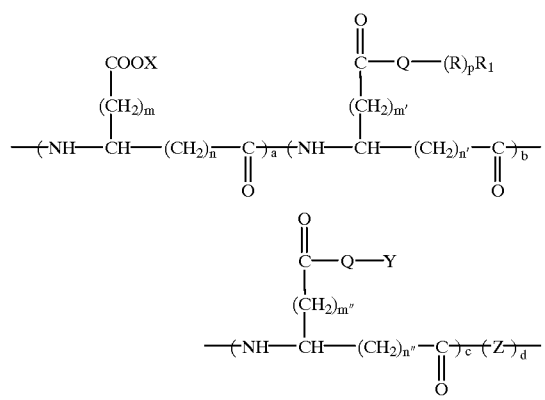

wherein X is at least one of hydrogen, an alkali earth metal ion, an alkaline earth metal ion, ammonium ion, and amine; R is at least one of $C_1$ to $C_6$ alkyl(ene) ether and mixtures thereof and $C_1$ to $C_6$ alkyl(ene) imine and mixtures thereof; Q is at least one of oxygen, nitrogen, and sulfur; p is a number from 1 to about 300 resulting in at least one of a linear side chain and branched side chain; $R_1$ is at least one of hydrogen, $C_1$ to $C_{20}$ hydrocarbon, and functionalized hydrocarbon containing at least one of —OH, —COOH, a derivative of —COOH, sulfonic acid, a derivative of sulfonic acid, amine, and epoxy; Y is a hydrophobic hydrocarbon or polyalkylene oxide moiety that functions as a defoamer; m, m', m", n, n', and n" are each independently 0 or an integer between 1 and about 20; Z is a moiety containing at least one of i) at least one amine and one acid group, ii) two functional groups capable of incorporating into the backbone selected from the group consisting of dianhydrides, dialdehydes, and di-acid chlorides, and iii) a succinimide residue; and wherein a, b, c and d reflect the mole fraction of each unit wherein the sum of a, b, c and d equal one, wherein a, b, c and d are each a decimal of value greater than or equal to zero and less than one, and at least two of a, b, c and d are greater than zero.

DETAILED DESCRIPTION OF THE INVENTION

This invention is directed to a polymer dispersant for cement or concrete comprising a substituted polyimide or polyamide composition, having at least some grafted oligomeric or polymeric side chains. The grafted side chains may include amides, esters, and thioesters. In a preferred embodiment, a majority of the polymer's (grafted) side chains are hydrophilic.

The polymer dispersant is produced by reacting a poly N-succinimide with at least one of an amide-, ester-, and thioester-producing nucleophile followed by further reacting the product thereof with at least one of an alkali or alkaline earth metal, an (alkyl) ammonium hydroxide, and a hydrocarbon ring-opening base. A hydrocarbon ring-opening base is a base capable of opening a hydrocarbon. The hydrocarbon ring-opening base includes a heteroatom. The grafted polymer dispersant has the general formula:

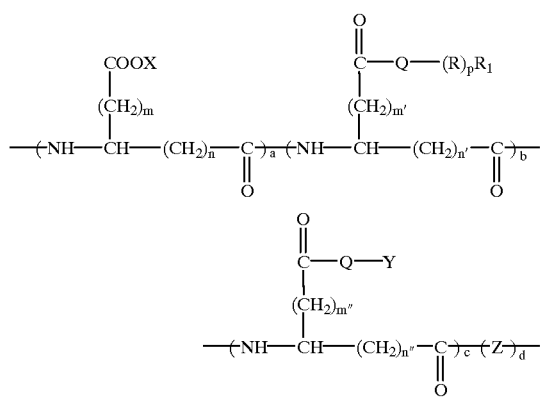

wherein X is at least one of hydrogen, an alkali earth metal ion, an alkaline earth metal ion, ammonium ion, and amine; R is at least one of $C_1$ to $C_6$ alkyl(ene) ether and mixtures thereof and $C_1$ to $C_6$ alkyl(ene) imine and mixtures thereof; Q is at least one of oxygen, nitrogen, and sulfur; p is a number from 1 to about 300 resulting in at least one of a linear side chain and branched side chain; $R_1$ is at least one of hydrogen, $C_1$ to $C_{20}$ hydrocarbon, and functionalized hydrocarbon containing at least one of —OH, —COOH, a derivative of —COOH, sulfonic acid, a derivative of sulfonic acid, amine, and epoxy; Y is a hydrophobic hydrocarbon or polyalkylene oxide moiety that functions as a defoamer; m, m', m", n, n', and n" are each independently 0 or an integer between 1 and about 20; Z is a moiety containing at least one of i) at least one amine and one acid group, ii) two functional groups capable of incorporating into the backbone selected from the group consisting of dianhydrides, dialdehydes, and di-acid chlorides, and iii) a succinimide residue; and wherein a, b, c and d reflect the mole fraction of each unit wherein the sum of a, b, c and d equal one, wherein a, b, c and d are each a decimal of value greater than or equal to zero and less than one, and at least two of a, b, c and d are greater than zero.

More particularly, Y is at least one of a hydrophobic polyalkylene glycol block polymer and a hydrophobic polyalkylene glycol random polymer; and Z is at least one of an imide, a succinimide residue, a natural amino acid, a derived amino acid, $H_2N(CH_2)_kCOOH$, a derivative of $H_2N(CH_2)_kCOOH$, aminobenzoic acid, a derivative of aminobenzoic acid, $H_2N(CH_2)_kSO_3H$, a derivative of $H_2N(CH_2)_kSO_3H$, sulfanilic acid, and a derivative of sulfanilic acid where k is an integer between 1 and about 20. Most preferably $R_1$ is a $C_1$ to $C_4$ alkyl; and m, m', m", n, n', and n" are each independently an integer between 0 and 2. If Y is not present as a side chain, it may be formulated into the dispersant formulation for use in the cement or concrete mixture.

A preferred grafted polymer dispersant is produced by reacting a poly N-succinimide with a nucleophile such as an amine, alcohol, or thiol compound such as thiol terminated methoxy polyethylene glycol, followed by further reacting the product thereof with a hydrocarbon ring-opening base such as ammonium hydroxide, an alkali metal hydroxide, an alkaline earth metal hydroxide, or a compound providing the requirements of Z. The hydrocarbon ring-opening base includes a heteroatom. Suitable examples include but are not limited to NaOH, KOH, LiOH, $NH_3 \cdot H_2O$, and $Ca(OH)_2$.

In a preferred embodiment, the grafted polymer dispersant has the general formula:

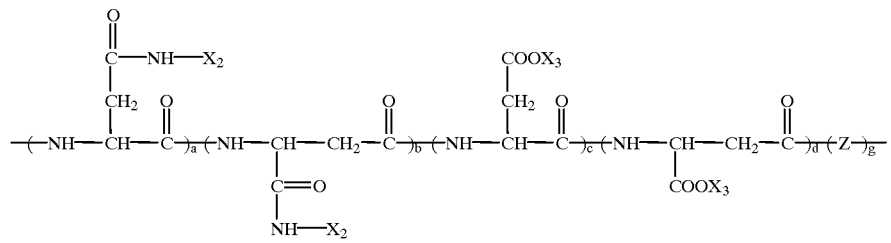

wherein a, b, c, d, and g reflect the mole fraction of each unit wherein the sum of a, b, c, d, and g equal one, wherein a, b, c, d, and g are each a decimal of value greater than or equal to zero and less than one, and at least two of a, b, c, and d are greater than zero; $X_3$ is at least one of i.) a moiety which will neutralize the negative charge on the carboxyl (COO$^-$) ion, and ii.) a hydrophobic hydrocarbon or polyalkylene oxide moiety that functions as a defoamer, which if chemically attached to the molecule, replaces no more than 20 mole % of $X_3$. Alternatively, the defoamer can be formulated with the dispersant. By way of example but not limitation, the neutralizing moiety can be an ammonium ion, ions of sodium, potassium, lithium, calcium, and the like. $X_2$ is a hydrophilic side chain having the structure:

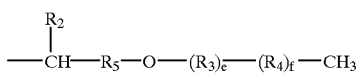

wherein $R_2$ is H, a $C_1$ to $C_4$ linear or branched alkyl, such as methyl, ethyl, propyl, or butyl, or phenyl; $R_5$ is a $C_1$ to $C_4$ linear or branched alkylene, such as methylene, an alkylene, or Phenylene; $R_3$ is a residue derived from ethylene oxide, and $R_3$ is present randomly or in block form; e is 1 to about 300, preferably about 11 to about 300; $R_4$ is a residue derived from propylene oxide, and $R_4$ is present randomly or in block form; f is 0 to about 180, preferably with a mole ratio of $R_3:R_4$ of 100:0 to about 40:60. Z is an imide group such as, but not limited to, a succinimide moiety. It is noted that the higher the proportion of propylene oxide present in the side chain, the less hydrophilic the side chain will be.

The a and c units of the preferred grafted polymer dispersant each represent an α linkage and the b and d units each represent a β linkage of the reacted unit of the reactant N-succinimide polymer. While it is possible to have 100% α or β, preferably the proportion of α to β linkage is about 1:100 to about 100:1.

The grafted polymer dispersant may contain an imide located at the point of attachment of the side chain with the polymer, or located in the backbone of the polymer. The grafted polymer dispersant has a molecular weight average of about 1,000 to about 1,000,000. More preferably, the grafted polymer dispersant has a molecular weight average of about 2,000 to about 100,000. Most preferably, the grafted polymer dispersant has a molecular weight average of about 3,000 to about 50,000. The units comprising the polymer may be present randomly or in block form. The polymer backbone is substantially linear, but could have slight branching, such as every $10^{th}$ residue.

Methods of making polyamides and polyimides are known in the art, as are methods of reacting the polymeric backbone with various substituents, as described in the Background of the Invention. Polysuccinimide can thus be prepared by thermally polymerizing aspartic acid or by reacting maleic acid and ammonia. As a non-limiting example of the present invention, the polysuccinimide is further reacted with a nucleophilic monomethoxy polyethylene glycol, amine or thiol, such as those available from Union Carbide under the tradename Carbowax, from BASF under the tradename Pluriol, or from Huntsman Corporation under the tradename Jeffamine M, followed by treatment with an alkali hydroxide to form the polymeric side chain grafted dispersant.

The inventive polymer dispersant is capable of providing a Type A to Type F water-reducing effect, as defined in ASTM C494, Standard Specification for Chemical Admixtures for Concrete.

The grafted polymer dispersants of the invention are added to mixtures of cementitious materials in amounts from about 0.01 to about 3.0%, preferably about 0.05 to about 1.0% by weight based on the weight of the cement. For example, the dispersant is preferably added prior to, during, or after initial mixing, to a cementitious composition mixture of a hydraulic cement, water, and aggregate, in which a reduced amount of water can be used compared to mixtures not containing the dispersant. The proportion of cement, water, and aggregate (if any) used in the cementitious composition mixture depends upon the end use desired, and is within the knowledge of the skilled artisan for a selected use.

The inventive polymer dispersant may be added to many different types of cementitious mixtures, and is not limited to the mixtures described above. Cementitious mixes in which the inventive polymer dispersant can be used as additives are mortars and concretes. The hydraulic binder used in the cementitious composition may be Portland cement, alumina cement, or blended cement, for example pozzolanic cement, slag cement, or other types, Portland cement being the preferred. Conventional admixtures in cement technology, such as set accelerators or retarders, frost protection agents, pigments, and the like, may also be present in the cementitious mixes of the invention.

SPECIFIC EXAMPLES

The following examples are not intended to limit the scope of this invention, as they are intended to be illustrative only.

Example 1 and Comparative Example A

Cement paste mixtures were prepared by mixing a Type I Portland cement and water containing three tenths of a percent (0.3%) of BNS based on the weight of the cement added to one mixture as Sample A, and one tenth of a percent (0.1%) of the inventive grafted polymer dispersant based on the weight of the cement added to the other mixture as Sample 1. The mix containing the grafted polymer dispersant was compared to the mix containing the BNS, which is a commonly used dispersant. As Table 1 illustrates, the grafted polymer dispersant showed improved viscosity and spread at one-third the dosage of BNS. Specifically, the grafted polymer dispersant showed about a 33% improvement over the BNS for viscosity, and about a 60% improvement over the BNS for spread. (Spread is the area covered at a given thickness by a given quantity of material. *Academic Press, Dictionary of Science and Technology*, p.2067 (1992)).

TABLE 1

Polymeric Dispersant vs. BNS

| Example | Material at 0.35 water content | Viscosity (mPas) | Flow (g/s) | Spread (cm) |
| --- | --- | --- | --- | --- |
| 1 | 0.1% Polymeric Dispersant | 1200 | 40 | 10 |
| A | 0.3% BNS | 1800 | 40 | 6 |

Example 2 and Comparative Examples B and C

Concrete mixtures were prepared by mixing cement, coarse and fine aggregate, water, and optionally dispersant. For Sample B, 0.145% based on the weight of the cement, of a comparative, conventional substituted styrene maleic copolymer dispersant was added to one mixture, and for Sample 2, 0.145% based on the weight of the cement, of the inventive polymer dispersant was added to the other mixture. The mix containing the inventive polymer dispersant was compared to the mix containing the conventional substituted styrene maleic copolymer dispersant, and both were compared to Sample C, a plain concrete mix. The inventive grafted polymer dispersant showed improved compressive strength, normal setting characteristics and good water reduction performance compared to the plain mix as illustrated in Table 2 below, and comparable or improved performance as compared to the conventional substituted styrene maleic copolymer dispersant containing mix.

TABLE 2

Polymeric Dispersant vs. Comparative Dispersant and Plain Dispersant

| Material | 1-day Compressive Strength (psi) | 7-day Compressive Strength (psi) | 28-day Compressive Strength (psi) | Set Time (hours) | Water Reduction (%) |
|---|---|---|---|---|---|
| Example 2 Polymeric Dispersant | 1630 | 4590 | 6390 | 5 | 14.9 |
| Example B Comparative Dispersant | 1620 | 4130 | 6200 | 4.75 | 14.7 |
| Example C Plain Dispersant | 1410 | 3630 | 5340 | 5 | — |

Example 3 and Comparative Examples D, E, and F

Four cement paste mixtures were prepared by mixing 500 grams of Ash Grove I cement with water to obtain a final 0.35 water to cement ratio (including water to be added with the dispersant). For Sample D, 0.1% based on the weight of the cement of a 30,000 molecular weight polyaspartate dispersant, as described in Example 1 of Japanese Patent Application No. 5-321720, was added to one mixture; for Sample E, 0.3% based on the weight of the cement of the 30,000 molecular weight polyaspartate dispersant was added to a second mixture; and for Sample F, 0.3% based on the weight of the cement of an ethanolamine derivative of a 25,000 molecular weight polyaspartate dispersant, as described in Example 2 of Japanese Patent Application No. 5-321720, was added to a third mixture. For Example 3, 0.1% based on the weight of the cement of the inventive polymer dispersant was added to the fourth mixture. The additive solution was weighted onto the paste and mixed using a mechanical mixer for one (1) minute at 700 revolutions per minute (RPM). The initial paste flow and spread was measured, and the flow test was repeated 15 minutes later. The mix containing the new polymer dispersant was compared to mixes D, E, and F. The inventive grafted polymer dispersant showed flow characteristics in comparison to mixes D, E, and F as illustrated in Table 3 below.

TABLE 3

Polymeric Dispersant vs. 30K Polyaspartate and Derivative of 25K Polyaspartate

| Example | Dosage (% of cement) | Starting Flow (g/s) | Starting Spread (cm) | Final Flow (g/s) |
|---|---|---|---|---|
| 3 | 0.1% Polymeric Dispersant | 79.3 | 14.4 | 101.6 |
| D | 0.1% 30K Polyaspartate | 0 | 0 | — |

TABLE 3-continued

Polymeric Dispersant vs. 30K Polyaspartate and Derivative of 25K Polyaspartate

| Example | Dosage (% of cement) | Starting Flow (g/s) | Starting Spread (cm) | Final Flow (g/s) |
|---|---|---|---|---|
| E | 0.3% 30K Polyaspartate Dispersant | 39.1 | 18.9 | 29.2 |
| F | 0.3% Derivative of 25K Polyaspartate Dispersant | 1.0 | 0 | 1.8 |

The inventive dispersant exhibited superior performance compared to the dispersant materials described in the art, which prior materials were ineffective at a 0.1% dose and generally performed poorer at even three (3) times the dosage of the inventive material. Polyaspartate itself, or its derivatives made with low molecular weight monomeric materials, show poor dispersant performance and maintain cement in a dispersed state for shorter times than the oligomeric and polymeric side chain substituted polyamide or polyimide dispersants of the present invention.

The present invention therefore provides a hydraulic cement or concrete dispersant material that is several times more efficient than the traditional dispersants such as BNS and SMF, as demonstrated by the results in Table 1. The present invention further provides a cement or concrete dispersant material with improved efficiency which reduces the amount of material required to achieve a desired level of concrete workability or water reduction as demonstrated by the results presented in Tables 1 and 3.

In addition, the present invention provides a cement or concrete dispersant material to improve concrete slump retention while maintaining normal setting characteristics. The present invention further provides a cement or concrete dispersant material capable of providing a Type A to Type F water-reducing effect, demonstrated in part by the results in Table 2.

Thus, the objects of the invention are accomplished by the present invention, which is not limited to the specific embodiments described above, but which includes variations, modifications, and equivalent embodiments defined by the following claims.

We claim:

1. A polymer cementitious composition dispersant for the improvement of the fluidity of said cementitious compositions comprising hydrophilic side chain substituted polyimide or polyamide backbone units, having at least some portion of grafted oligomeric or polymeric hydrophilic side chains linking at least one of amides, esters, and thioesters, and wherein the polymer cementitious composition dispersant is water soluble, said polymer dispersant having the general formula:

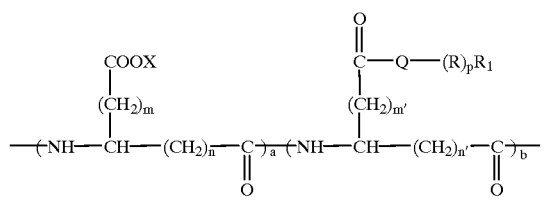

-continued

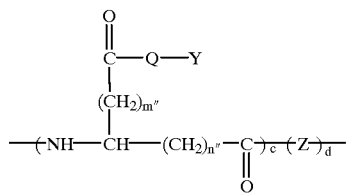

wherein
X is at least one of hydrogen, an alkali earth metal ion, an alkaline earth metal ion, ammonium ion, and amine;
R is at least one of $C_1$ to $C_6$ alkyl(ene) ether and mixtures thereof and $C_1$ to $C_6$ alkyl(ene) imine and mixtures thereof;
Q is at least one of oxygen, nitrogen, and sulfur;
p is a number from 1 to about 300 resulting in at least one of a linear side chain and branched side chain;
$R_1$ is at least one of hydrogen, $C_1$ to $C_{20}$ hydrocarbon, and functionalized hydrocarbon containing —OH;
Y is a hydrophobic hydrocarbon or polyalkylene oxide moiety that functions as a defoamer;

m, m', m", n, n', and n" are each independently 0 or an integer between 1 and about 20;
Z is a moiety containing at least one of i) at least one amine and one acid group, ii) two functional groups capable of incorporating into the backbone selected from the group consisting of dianhydrides, dialdehydes, and di-acid-chlorides, and iii) a succinimide residue; and
wherein a, b, c, and d reflect the mole fraction of each unit wherein the sum of a, b, c, and d equal one, wherein a, b, c, and d are each a decimal of value greater than or equal to zero and less than one, and at least two of a, b, c, and d are greater than zero.

2. The polymer dispersant of claim 1, wherein $R_1$ is a $C_1$ to $C_4$ alkyl.

3. The polymer dispersant of claim 1 wherein Y is at least one of a hydrophobic block polymer and random polymer of polyalkylene glycol.

4. The polymer dispersant of claim 1 wherein m, m', m", n, n', and n" each independently are an integer between 0 and 2.

5. The polymer dispersant of claim 1 wherein Z is at least one of a succinimide residue, a natural amino acid, an amino acid residue, $H_2N(CH_2)_kCOOH$, an ester or amide derivative of $H_2N(CH_2)_kCOOH$, aminobenzoic acid, an ester or amide derivative of aminobenzoic acid, $H_2N(CH_2)_kSO_3H$, an ester or amide derivative of $H_2N(CH_2)_kSO_3H$, sulfanilic acid, and an ester or amide derivative of sulfanilic acid where k is an integer between 1 and about 20.

6. The polymer dispersant of claim 1 wherein the weight average molecular weight of the polymer is about 1,000 to about 1,000,000.

7. The polymer dispersant of claim 1 wherein the weight average molecular weight of the polymer is about 2,000 to about 100,000.

8. The polymer dispersant of claim 1 wherein the weight average molecular weight of the polymer is about 3,000 to about 50,000.

9. The polymer dispersant of claim 1 wherein the units comprising the polymer are present randomly.

10. The polymer dispersant of claim 1 wherein the units comprising the polymer are present in block form.

11. The polymer dispersant of claim 1 wherein the backbone is substantially linear.

12. The polymer dispersant of claim 1 wherein a majority of the grafted oligomeric or polymeric side chains are hydrophilic.

13. The polymer dispersant of claim 1 capable of providing a Type A to Type F water-reducing effect, as defined in ASTM C494.

14. A polymer dispersant having a hydrophilic side chain substituted backbone according to claim 1 having the general formula:

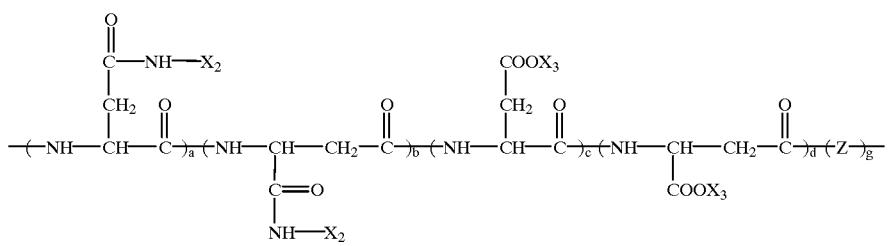

wherein
a, b, c, d, and g reflect the mole fraction of each unit wherein the sum of a, b, c, d, and g equal one, wherein a, b, c, d, and g are each a decimal of value greater than or equal to zero and less than one, and at least two of a, b, c, and d are greater than zero;
$X_3$ is at least one of i) a moiety which will neutralize the negative charge on the carboxyl ($COO^-$) ion, and ii) a hydrophobic hydrocarbon or polyalkylene oxide moiety that functions as a defoamer, which if chemically attached to the molecule, replaces no more than 20 mole % of i);
$X_2$ is a hydrophilic side chain having the structure:

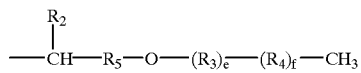

wherein
$R_2$ is H, a $C_1$ to $C_4$ linear or branched alkyl or phenyl;
$R_3$ is a residue derived from ethylene oxide;
$R_4$ is a residue derived from propylene oxide;
$R_5$ is a $C_1$ to $C_4$ linear or branched alkylene, or phenylene;
e is 1 to about 300;
f is 0 to about 180;
$R_3:R_4$ is 100:0 to about 40:60; and
Z is an imide group.

15. The polymer dispersant according to claim 14 wherein $X_3$ comprises a neutralizing moiety selected from the group consisting of ammonium ion, ions of sodium, potassium, lithium, calcium, and mixtures thereof.

16. The polymer dispersant according to claim 14 wherein a defoamer is formulated with the dispersant.

17. The polymer dispersant according to claim 14 wherein the $R_3$ and the $R_4$ components are present randomly or in block form.

18. The polymer dispersant according to claim 14 wherein e is about 11 to about 300.

19. A polymer dispersant according to claim 1 produced by reacting a poly N-succinimide backbone with at least one of an amide-, ester-, and thioester-producing nucleophile.

20. The polymer dispersant as in claim 19 wherein said reacting is followed by further reacting the product thereof with a hydrocarbon ring-opening base.

21. The polymer dispersant as in claim 20 wherein said hydrocarbon ring-opening base is selected from the group consisting of ammonium hydroxide, an alkali metal hydroxide, an alkaline earth metal hydroxide, a compound providing the requirements of Z, and mixtures thereof.

22. The polymer dispersant as in claim 21 wherein said hydrocarbon ring-opening base is selected from the group consisting of NaOH, KOH, LiOH, $NH_3 \cdot H_2O$, $Ca(OH)_2$, and mixtures thereof.

23. The polymer dispersant of claim 19 wherein the a and c units each comprise an α linkage and the b and d units each comprise a β linkage of the reacted units in the N-succinimide polymer.

24. The polymer dispersant of claim 23 wherein the proportion of α to β linkages is about 100:1 to about 1:100.

25. The polymer dispersant of claim 19 wherein an amide is located at the point of attachment of the side chain with the polymer backbone.

26. The polymer dispersant of claim 19 wherein an amide or imide is located in the backbone of the polymer.

27. A cementitious mixture containing cement, water, and the oligomeric or polymeric dispersant of claim 1.

28. The cementitious mixture of claim 27 wherein the mixture additionally includes aggregate.

29. A cementitious mixture containing cement, water, and the oligomeric or polymeric dispersant of claim 14.

30. The cementitious mixture of claim 29 wherein the mixture additionally includes aggregate.

31. A polymer dispersant having a hydrophilic side chain substituted backbone according to claim 1 having the general formula:

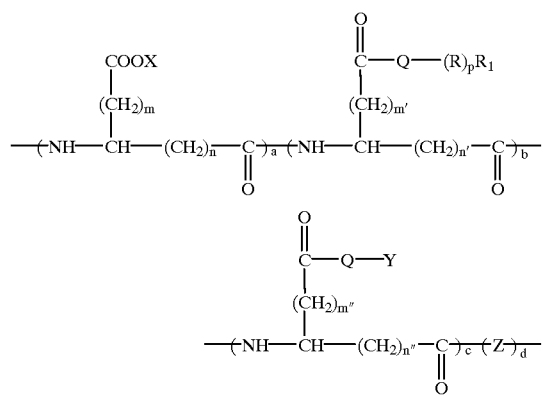

wherein

X is at least one of hydrogen, an alkali earth metal ion, an alkaline earth metal ion, ammonium ion, and amine;

R is a $C_1$ to $C_6$ alkyl(ene) ether and mixtures thereof;

Q is NH;

p is a number from 1 to about 300 resulting in at least one of a linear side chain and branched side chain;

$R_1$ is at least one of hydrogen, $C_1$ to $C_{20}$ hydrocarbon, and functionalized hydrocarbon containing —OH;

Y is a hydrophobic hydrocarbon or polyalkylene oxide moiety that functions as a defoamer;

m, m', m", n, n', and n" are each independently 0 or an integer between 1 and about 20;

Z is a moiety containing at least one of i) at least one amine and one acid group, ii) two functional groups capable of incorporating into the backbone selected from the group consisting of dianhydrides, dialdehydes, and di-acid-chlorides, and iii) a succinimide residue; and wherein a, b, c, and d reflect the mole fraction of each unit wherein the sum of a, b, c, and d equal one, wherein a, b, c, and d are each a decimal of value greater than or equal to zero and less than one, and at least two of a, b, c, and d are greater than zero.

* * * * *